United States Patent [19]

Feezor

[11] 3,793,484

[45] Feb. 19, 1974

[54] PROGRAMMABLE AUDIO LEVEL CONTROL USEFUL IN AUDIOMETRIC APPARATUS

[75] Inventor: Michael D. Feezor, Chapel Hill, N.C.

[73] Assignee: Audiometric Teleprocessing, Inc., Chapel Hill, N.C.

[22] Filed: Nov. 13, 1972

[21] Appl. No.: 306,351

[52] U.S. Cl. .................... 179/1 N
[51] Int. Cl. .................... H04r 29/00
[58] Field of Search 179/1 N, 1 VL, 1 D; 181/0.5 G

[56] References Cited

UNITED STATES PATENTS

| | | | |
|---|---|---|---|
| 3,673,328 | 6/1972 | Grason | 179/1 N |
| 3,654,391 | 4/1972 | Arquimbau | 179/1 N |
| 2,982,914 | 5/1961 | Steward | 179/1 N |
| 3,725,583 | 4/1973 | Gunderson | 179/1 VL |

*Primary Examiner*—Thomas W. Brown
*Assistant Examiner*—Jon Bradford Leaheey

[57] ABSTRACT

A programmable audio level control is adapted, through the utilization of solid state functional logging and exponentiating components and an additive amplitude determinant voltage quantity, to programmably control the output amplitude level of a selected input audio signal while maintaining precisely the same frequency and impedance as the original input signal.

30 Claims, 17 Drawing Figures

PROGRAMMABLE AUDIO LEVEL CONTROL USEFUL IN AUDIOMETRIC APPARATUS

BACKGROUND OF THE INVENTION

1. Field of the Invention

This invention relates to programmable audio level control devices useful in audiometric apparatus.

2. Description of the Prior Art

In the field of audiology, it has frequently been useful to combine a potentiometer or attenuator with a motorized drive mechanism in an audiometer, so as to programmably vary the amplitude level of a given signal at a given frequency, and in so doing ascertain a given person's hearing threshold. This is especially the case in audiometers and audiological devices which operate in accordance with the teachings of Von Bekesy, since these are adapted to be continuously swept over a wide decibel range, e.g., 0–90 db, in order to accurately determine the degree of hearing loss. In these types of audiometers and audiological apparatus, the programmable audio level control devices employed have largely been directed to electromechanically operated potentiometers wherein a sliding contact moving along a resistive wound element provides the degree of signal attenuation desired.

As an improvement to so-called Bekesy audiometers, the Grason-Stadler Corporation has recently obtained U.S. Pat. No. 3,673,328 for a rate of amplitude change control adapted to vary signal amplitude from a relatively high rate to a relatively low rate as a test sequence progresses. This enables a test subject to rapidly seek his hearing threshold. Such amplitude change control although employing a solid state counting circuit, also uses switches, cam drives, gear means and motorized means all of which are sources of acoustic noise. In principal of operation the amplitude change control in the above cited patent effects rate of amplitude changes in a stepwise fashion based on the number of subject responses. Such stepwise amplitude changes appear to be more confusing to a test subject than does a continuous amplitude change free of acoustic noise as this invention provides.

Other apparatus commonly employed to test hearing have not required that the signal be continuously swept through a given decibel range, but rather have employed stepping switches, relays, and the like, to incrementally vary the sound pressure level an examinee is hearing in a stepwise fashion. This type of sound attenuating device also lends itself to being programmed by appropriate logic means. The Grason-Stadler Corporation, for example, has recently made publicly available a digitally programmable attenuator utilizing a plurality of fixed resistive attenuators switched in a binary sequence. While constituting a major advance in the field of audiological apparatus, this last mentioned and all other known types of attenuators possess certain inherent drawbacks as will now be described.

Since the potentiometric attenuators presently in use are mechanical by nature, they are subject to wear and deterioration. In the case of rotatable wiper arms moving against a resistive coil, dust and worn particles are scraped from the coil after a period of use. Such dust and particles inhibit optimum contact between the wiper arm and the coil resulting in a "noisy" attenuator. This type of "noise" will appear to the test examinee as bothersome scratching and popping, and may adversely affect his ability to correctly respond to the actual test tones presented during a hearing test. Likewise, attenuators operating in a stepwise fashion tend to generate voltage transient noise as contact is made and broken between the various switches. This too will appear as extraneous noise to the test examinee. Due to the presence of excessive switching transients between attenuative steps, a digitally operable attenuating device of the type mentioned is wholly unsuited for the continuous level sweeping operation as required by the Von Bekesy system. In addition, any spurious or system generated noise will distort the input signal frequency causing the test examinee to respond to tones other than the controlled test frequencies, and thus invalidating a hearing test.

The problems of electromechanical attenuators and potentiometers have made it increasingly more desirable to use electronic components which can be electrically programmed and which have no moving component parts to wear. Heretofore, these electronic components have been directed to electrically altering the resistance of a circuit element, and have included such devices as the field effect transistor (F.E.T.), various diodes, transistors in which a bias current is adapted to induce variance in gain qualities, and the photo-resistor in which the amount of light falling upon the component is approximately inversely proportional to the resistance of the component. However, these devices have characteristically introduced electrical nonlinearity and distortion at some degrees of attenuation, functional nonlinearity, wherein the degree of attenuation in decibels is not directly proportional to the varying control voltage over a wide range of attenuation, e.g., 0–90 dB, and where transistors and diodes have been employed, have been characterized by temperature instability over long periods of operating time. It can be seen that while the present invention is basically electronic in nature it eliminates the need to alter a component resistance as in the prior art. Thus, the undesirable characteristics just mentioned are substantially eliminated. In contrast to the prior art, the present invention is based on the discovery that electronic control over the amplitude of a given audio signal can be much improved by the use of functional logging and exponentiating solid state components in conjunction with an additive variable control voltage acting only on the amplitude component of a given input audio signal, so as to precisely maintain the frequency and linearity of the signal, while substantially varying the amplitude component.

SUMMARY OF THE INVENTION

The present invention is directed to a programmable audio level control useful in audiometric apparatus, of the type wherein the sound pressure level a test examinee is hearing is adapted to be continuously increased or decreased. In preferred form, the circuitry comprises a series of operational amplifiers and associated diode elements adapted to electrically compute the logarithm of a selected input signal, add a variable control voltage adapted to proportionally control the output amplitude of the input signal, and finally electrically exponentiate the resultant sum. Means are provided to suitably regulate and program the amount of variable control voltage added, and consequently, the amount of control voltage added may be used as a proprotional measure of the output signal amplitude. The present invention, therefore, provides programmable as well as measurable level control over a selected input audio signal. By 'audio signal' what is meant is any signal frequency falling within the range of frequencies applicable to testing human ears, e.g., 100 hertz — 15 kilohertz.

An object of the present invention is, therefore, to provide a programmable audio level control employing functional logging and exponentiating circuitry.

Another object of the invention is to provide a programmable audio level control circuit which is adapted to vary the gain qualities of a given audio signal without imparting additional extraneous noise, which introduces frequency distortion, thus preserving the linearity of the original signal.

Another object of the invention is to provide a broadband programmable audio level control circuit which is adapted to maintain proportionality between an additive variable control voltage and the output sound pressure level of a given input audio signal through a substantially large attenuation range, e.g., 90 decibels.

Another object of the invention is to provide a continuously varying programmable audio level control circuit suitable for use in precision automatic audiometers, requiring continuous sweeping of the output sound pressure level.

Another object of the invention is to provide a level control circuit suitable for use in precision automatic audiometers wherein an additive ramp control voltage is adapted to change in instantaneous slope from a predetermined steep slope at the onset of, say, a hearing test tone, and to decrease in slope at a predetermined rate during the tone enabling a test subject to attain his hearing threshold level early in the tone presentation, and accurately approximate thatlevel during the remainder of the tone presentation.

Another object of the present invention is to provide a continuously varying programmable audio level control circuit having no moving component parts.

The foregoing and other objects of the present invention will become apparent from the drawings, description and appended claims which follow.

DESCRIPTION OF THE PREFERRED EMBODIMENT

In the description which follows, two embodiments of the present invention circuitry are described in connection with the drawings. In both embodiments the level control or attenuator is characterized by having the output signal level, expressed in decibels, linearly related to the control voltage applied. The first embodiment utilizes three operational amplifiers in conjunction with other circuit elements to achieve the desired signal amplitude controlling result, while the second embodiment, which is considered the preferred form of the invention, utilizes as few as two operational amplifiers in conjunction with other circuit elements to control signal amplitude. Since the preferred form of the invention circuit is best described in cooperation with other circuits arranged for possible use in an automatic audiometer adapted for simultaneous testing of a plural number of individuals, while the first embodiment may be more simply described by itself, the first embodiment will be initially described in the interest of gaining a better understanding of the present invention operation and a fuller appreciation of its numerous advantages, particularly as applied to the second and preferred embodiment.

Figure 1:
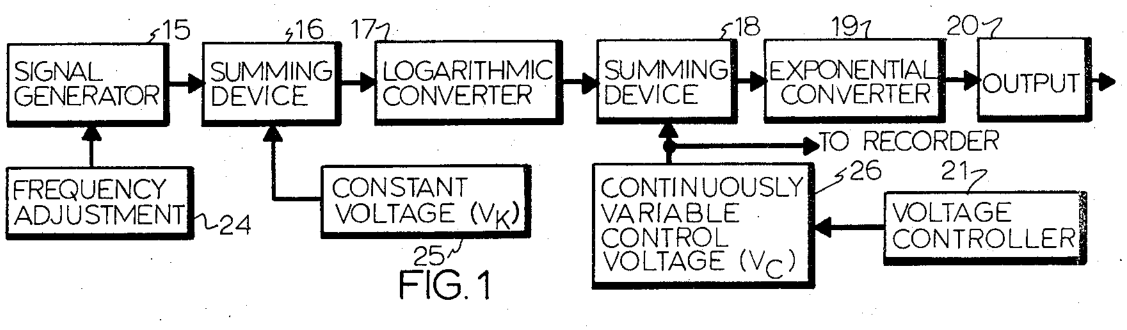
FIG. 1 is a generalized block diagram of the invention circuitry in a first embodiment.

Referring to FIG. 1, in the first embodiment a signal generator 15 having related frequency adjustment means 24 is adapted to generate an audio signal at predetermined frequency into an electronic circuit comprising: a summing device 16, adapted to combine the generated audio signal with an incoming constant direct current voltage supply 25; a functional logarithmic converter 17 adapted to compute the logarithm of the resultant sum; a continuously variable additive control voltage portion 26 including a suitable voltage source (not shown) and means 21 adapted to vary the magnitude and direction of said voltage source, said continuously variable control voltage being adapted to be combined with said generated logged signal by a summing device 18; a exponentiating portion 19 adapted to compute the antilogarithm of said last mentioned sum; and an output portion 20 adapted to remove the direct current component from said exponentiated signal yielding an output signal having precisely controlled gain qualities and which, expressed in decibels, is in linear proportion to said varying control voltage.

Figure 2:
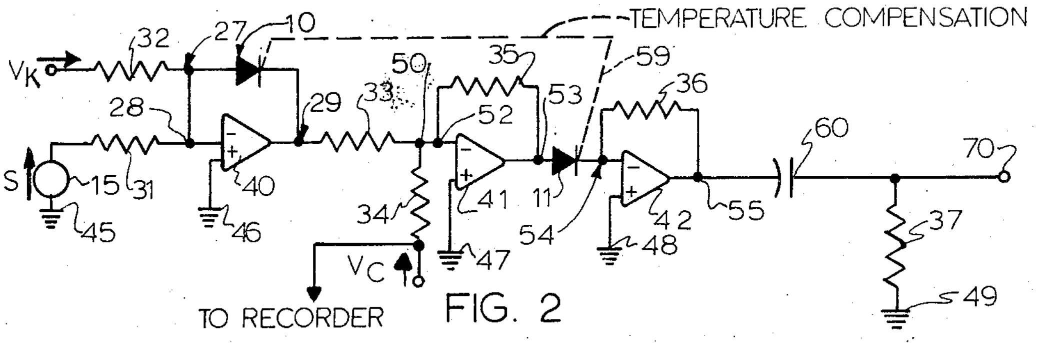
FIG. 2 is a somewhat schematic diagram of an electronic circuit according to the first embodiment of the present invention.

Referring now to FIG. 2, which schematically represents a circuit embodying the invention, a signal generator 15 is adapted to generate an input signal S, e.g., a sine wave, at predetermined frequency, amplitude, and impedance through a first resistor 31 of matching impedance, and into a first computing amplifier 40. A constant regulated voltage supply $V_k$ provides current which flows through a second resistor 32 and enters computing amplifier 40 through junctions 27, 28. Computing amplifier 40 is adapted to compute the electrical sum of input signal S voltage and constant voltage $V_k$, in order to ensure that the magnitude of $S + V_k$ is always greater than zero, and that S is of unchanging polarity preparatory to logging and exponentiating operations. If the signal emanating from signal generator 15 is of unchanging polarity and is greater than zero, the addition of a voltage constant $V_k$ is omitted.

A first diode 10 in shunt configuration around amplifier 40 connects between junction 27 and the output lead of amplifier 40 at junction 29 and is adapted to compute the logarithm of the sum $S + V_k$. The signal, in log form, is then passed through a third resistor 33 and joined with incoming control voltage $V_c$ at junction 50. Control voltage $V_c$ is preferably regulated by appropriate solid state control means, e.g., a ramp generating analog or digital integrator, so as to yield a continuously varying voltage having equivalent rising and falling times and which can be activated by either manually operable controls, i.e., hand held switch, or by suitable programmable means, i.e., logic circuitry. The control voltage $V_c$ may, for example, be adapted to decrease corresponding to release of a hand held switch, or to increase corresponding to depression of said switch. Alternately, appropriate logic circuitry may be programmed and utilized to command the invention circuit to sweep through any attenuation sequence desired. Voltage $V_c$ is passed through a fourth resistor 34 and joins signal log $(S + V_k)$ at junction 50. The resultant combined signal passes into a second computing amplifier 41, adapted to compute the electrical sum of signal log $(S + V_k)$ plus $V_c$. A shunt circuit communicating between input 52 and output 53 leads of amplifier 41, includes a fifth resistor 35, adapted to maintain the correct low input bias voltage required by, and to determine the overall gain of amplifier 41. The resultant signal is fed into a second diode 11, and a third computing amplifier 42 which, together with diode 11, are adapted to perform exponentiation of the incoming signal. A shunt circuit connecting between input 54 and output 55 leads of amplifier 42 includes a sixth resistor 36 adapted to maintain the correct low input bias voltage required by and to determine the overall gain of amplifier 42. The resultant exponentiated signal is passed through capacitor 60 and resistor 37 which together remove the exponentiated direct current component of the signal, leaving a signal having the same frequency as the original signal S, but now having controlled gain qualities, with respect to signal amplitude. Appropriate grounding points 45, 46, 47, 48, 49 on the various components of the circuit, maintain the correct voltage polarity. In the particular circuit embodiment shown, the positive summing junctions are grounded due to the signal inverting operations of the amplifiers employed. As represented by dashed lines 59, diodes 10, 11 are suitably temperature compensated by appropriate means, e.g., are embedded in a temperature conductive material such as epoxy. In an alternate version of the first embodiment of the invention, a pair of diode- or logarithmic transconductor-connected matched transistors having like functional qualities may be substituted for diodes 10, 11.

The operation of the invention circuit may be mathematically described in the following equations wherein use is made of the fact that for certain readily available silicon diodes operating over a wide range of forward currents, the voltage current relationship is very closely approximated by the well-known PN junction equation:

$$I_F = I_S(e^{qV/KT} - 1)$$

where $I_F$ = forward current of diode $I_S$ = reverse or saturation current $e$ = natural logarithm base (2.71828)

$q$ = electron charge ($1.6 \times 10^{-19}$ coulombs)

$V$ = applied bias voltage $K$ = Boltzmann's constant ($1.38 \times 10^{-23}$ watt sec./°k)

$T$ = absolute temperature °k

Reference is made to *General Electric Transistor Manual*, J. F. Cleary, Editor, Vol. 7, Chapter 1, "Basic Semiconductor Theory," pages 24–25. (General Electric Semiconductor Product Dept., Electronics Park, Syracuse, New York)

At room temperature (300°k) the equation reduces to $$I_F = I_S\,(e^{38.6V} - 1).$$

For purposes of derivation in conjunction with the objects of the instant invention, it is assumed that for all logging and exponentiating diodes $e^{38.6V} >> 1$. This inequality is adequately satisfied whenever $V > .2$ volts and under typical operating conditions of the invention circuit the forward diode voltage does not fall below 300 millivolts. Therefore, $I_F \approx I_S e q^V / KT$ or equivalently, $V = KT/q \ln I_F/I_S$. e.g.

Based on the above approximation and referring to circuit diagram FIG. 2, the input signal at the summing junction of amplifier 40 is: $I_1 = V_K/R_{32} + A \sin wt/R_{31}$ where $A$ is the amplitude of the sine wave of frequency $w$, and where $V_K R_{32} > A/R_{31}$ and $V_K > 0$ always. The log converted signal $V_L$ at the output of amplifier 40 is then: $V_L = -KT/q \ln I_1/I_S$. Amplifier 41 is in an inverting summation configuration with a gain of −1. Its output is then: $V_2 = -V_c/R_{34} + KT/q \ln I_1/I_{S_1}$. Voltage $V_2$ is applied across diode 11 and results in a forward current flow through that diode equal to:

$I_F \approx I_{S_2}\, eq/KT\,(-V_c/R_{34} + KT/q \ln I_1/I_{S_1}) = I_{S_2}\, I_1/I_{S_1}\, e - qV_c/KTR_{34}$, where $I_{S_1}$ and $I_S$ are the saturating currents of logging diode 10 and exponentiating diode 11 respectively.

If the diodes are matched such that $I_{S_1}$ approximates $I_{S_2}$ over a given temperature range, and if they are maintained during operation at the same temperature by a thermal compensation means 59, i.e., imbedded in epoxy or other thermally conductive medium, then the above equation reduces to: $I_F \approx I_1\, e\, -qV_c/KTR_{34}$, and the output voltage of amplifier 42 is given by $V_{OUT} = -R_{36}\, I_F \approx -R_{36}I_1 e\, -qV_c/KTR_{34}$ . Expanding $I_1$ in terms of its definition, $V_{OUT} = -(VkR_{36}R_{32} + R_{36}\, A \sin wt/R_{31})\, e\, -qV_c/KTR_{34}$ . For $V_k$ varying slowly, the first term of the above equation contains only low frequencies which are removed by the action of the capacitor 60 and resistor 37 combination. The resulting net equation is therefore: $V_{OUT} = AR_{36}/R_{31}\, e - qV_c/KTR_{34}$. Converting this equation to base 10 where $\ln 10 = 2.3$ or $\ln x = 2.3 \log_{10} x$ the resultant equation is: $V_{OUT} = AR_{36}/R_{31} \exp_{10} -qV_c/2.3\, KTR_{34}$ . Converting $V_{OUT}$ to decibels with respect to a given constant voltage, $V_{REF}$, the final output level is: $dB = 20 \log_{10} V_{OUT}/V_{REF} = 20 \log_{10} V_{OUT} - 20 \log V_{REF} = (20 \log_{10} AR_{36}/R_{31}) - qV_c/2.3KTR_{34} - 20 \log_{10} V_{REF}$.

The first and third terms of the last expression are constant. At a constant temperature, the second term of the expression is directly proportional to $V_c$. This is expressed concisely by:

$$dB = K_1 + K_2\, V_c$$

where $K_1 = 20 \log_{10} AR_{36}/R_{31}V_{REF}$ and $K_2 = -q/2.3\, KTR_{34}$.

From the above equations it is apparent that the functional logging and exponentiating techniques employed by the present invention circuit have the advantage of providing a linearly proportional relationship between the amount of control voltage $V_c$ applied, and the final output level in decibels of a given input signal S.

Figure 3:
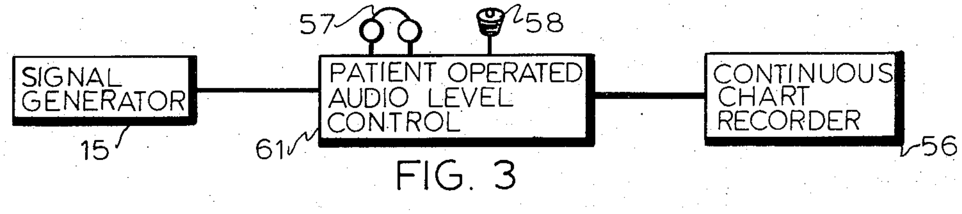
FIG. 3 is a block diagram showing a typical application of the invention circuitry in a hearing testing apparatus.
Figure 4A:
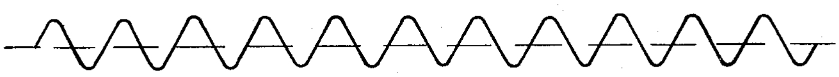
FIG. 4A is a generalized waveform of a typical input audio signal.
Figure 4B:
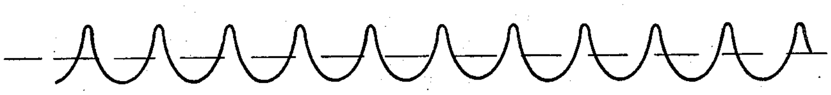
FIG. 4B is a generalized waveform of a typical input signal logarithmically converted.
Figure 4C:
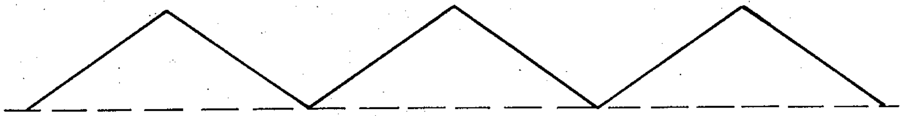
FIG. 4C is a generalized waveform of a varying control voltage.
Figure 4D:
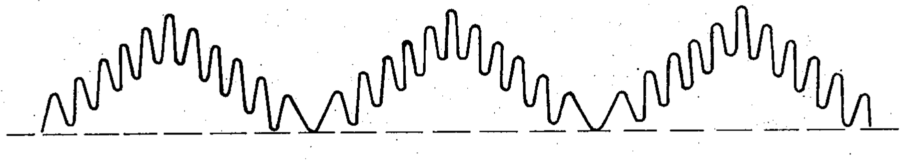
FIG. 4D is a generalized waveform representing the sum of the logged signal (shown on a smaller scale than FIG. 4B) and the varying control voltage.
Figure 4E:
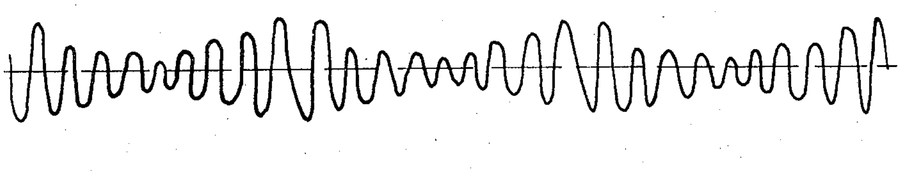
FIG. 4E is a generalized waveform representing the exponentiated sum of the logged signal and varying control voltage, having low frequency components removed.

Referring to FIG. 3, in actual practice a circuit was constructed in accordance with FIG. 1, generally designated 61 and was combined with the following elements: sine wave generator 15, continuous chart recorder 56, earphones 57, and examinee switch 58, representing a possible use of the invention circuitry in a hearing testing apparatus of the type wherein the test examinee controls the sound pressure level of the audio signal presented to him. Under operating conditions over a frequency range of 500–6000 hertz and a sound pressure level range of approximately 0–85 dB, the invention circuitry yielded accurate level control to within 0.14 dB. As in conventional automatic audiometry, operation proceeds as the user listens through the earphones 57 until a signal becomes audible, then he depresses the control switch 58 until the signal becomes inaudible. The process is repeated at various frequencies to establish a hearing range at different frequencies for a selected individual, from which a figure of hearing loss or damage can be calculated. Note that with the invention circuitry this figure of hearing loss may now be obtained from the control voltage $V_c$ which is directly proportional to the output signal in dB. It is contemplated that when the level control of the invention is applied to an audiological use small voltages may be added to or deleted from the control voltage $V_c$ for each frequency being utilized to compensate for earphone deficiencies and the well-known Fletcher-Munson equalization curve at each frequency.

Referring now to FIG. 4, the action by the invention circuitry upon an audio signal source of given amplitude and frequency is graphically shown. A signal source having a sinusoidal waveform with constant frequency and amplitude is represented by FIG. 4-A. This signal may suitably be a "pure tone" audio signal within the normal hearing range and may be generated by a sine generator or other well-known means. FIG. 4-B represents a typical input signal, only converted into logarithmic form. FIG. 4-C represents the continuously varying control voltage source having equivalent rise and fall times, the outer envelope of which is regulated by the operator through previously mentioned control means. FIG. 4-D represents the sum of the logged signal and the varying voltage source. FIG. 4-E represents the final exponentiated output signal having decibel gain qualities inversely and linearly proportional to the rising and falling action of the varying control voltage $V_c$, and having frequency equal to the original signal S. Therefore, as more voltage is applied to the invention circuit, greater positive signal attenuation from a fixed maximum amplitude is realized. This final output signal is shown with low frequency components removed for purposes of illustration, Through the alternate use of non-inverting operational amplifiers the above relationship becomes linearly proportional.

As previously noted, the addition of constant voltage $V_k$ serves to provide the input signal S with a fixed polarity, as well as a voltage quantity greater than zero. If a signal source, having fixed polarity and emitting a signal having voltage greater than zero, is provided by signal generator 15, the addition and final deletion of a voltage constant is not required.

Figures 5, 6:
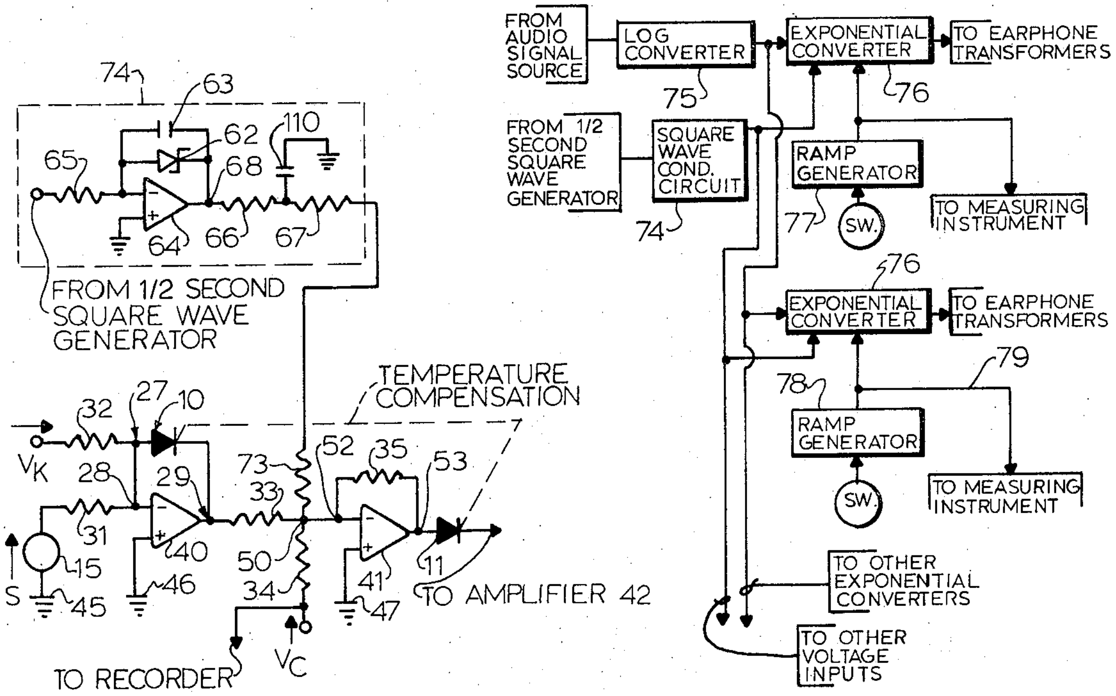
FIG. 5 is a somewhat schematic diagram of a portion of the first invention embodiment circuitry showing a circuit adapted to deliver a modified square wave into the invention circuit.
FIG. 6 is a generalized block diagram of the second embodiment circuitry which constitutes the preferred form.
Figure 7:
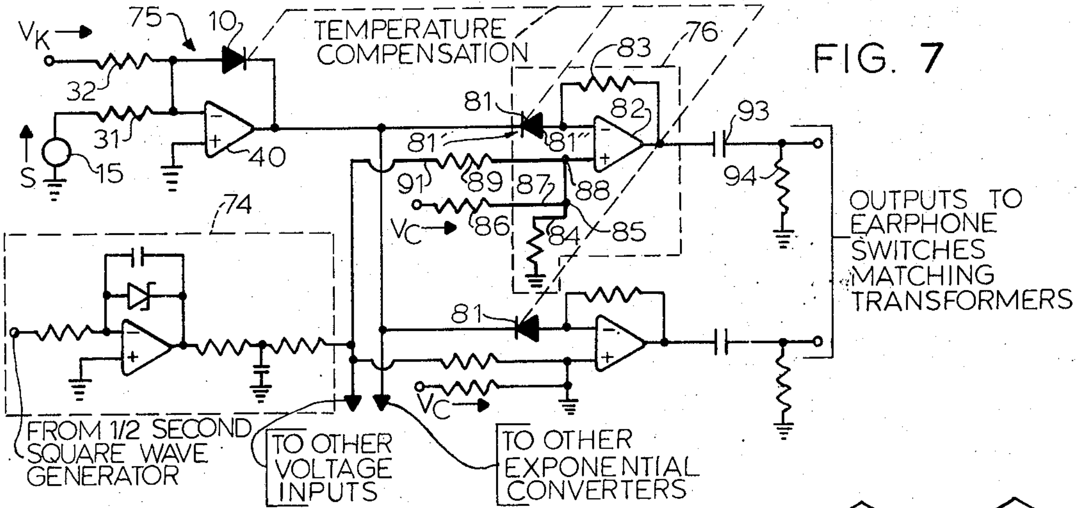
FIG. 7 is a somewhat schematic diagram of the preferred embodiment circuitry, including a circuit adapted to deliver a modified square wave into the invention circuit.
Figure 8A:
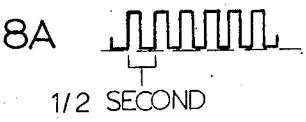
FIG. 8A is a generalized waveform of a square wave having a one-half second period.
Figure 8C:
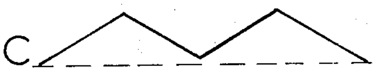
FIG. 8C is a generalized waveform of an ascending-descending linear ramp voltage.
Figure 8B:
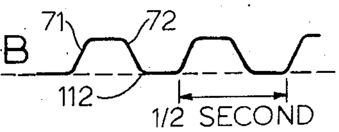
FIG. 8B is a generalized wave form of a modified square wave having a one-half second period.
Figure 8D:
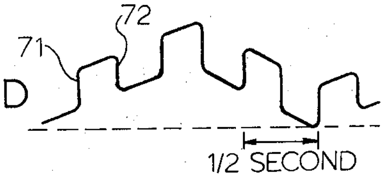
FIG. 8D is a generalized waveform representing the combination of a modified square wave having a one-half second period, and an ascending-descending linear ramp voltage as shown in FIG. 8C.
Figure 9:
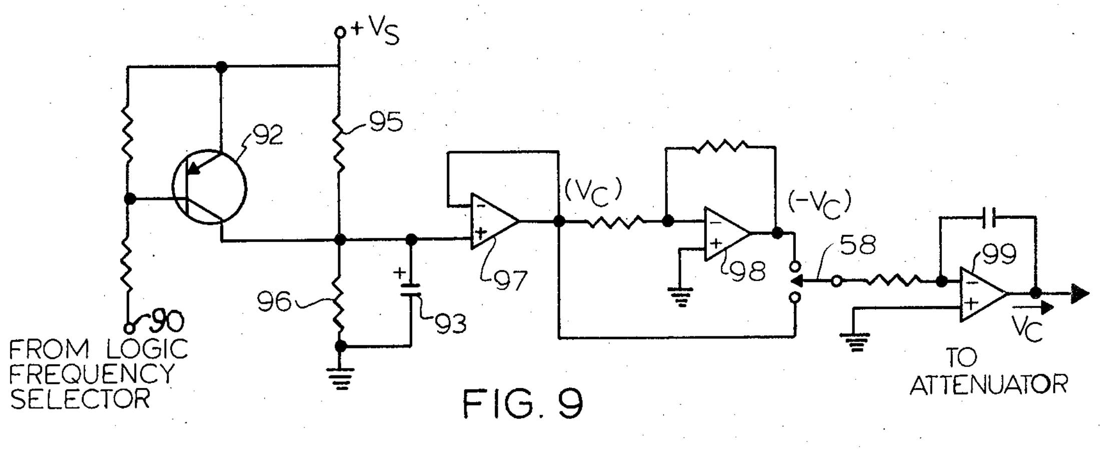
FIG. 9 is a somewhat schematic diagram of a circuit adapted to programmably vary the instantaneous slope of control voltage from a steep slope to more gradual slope at a predetermined rate.
Figure 10:
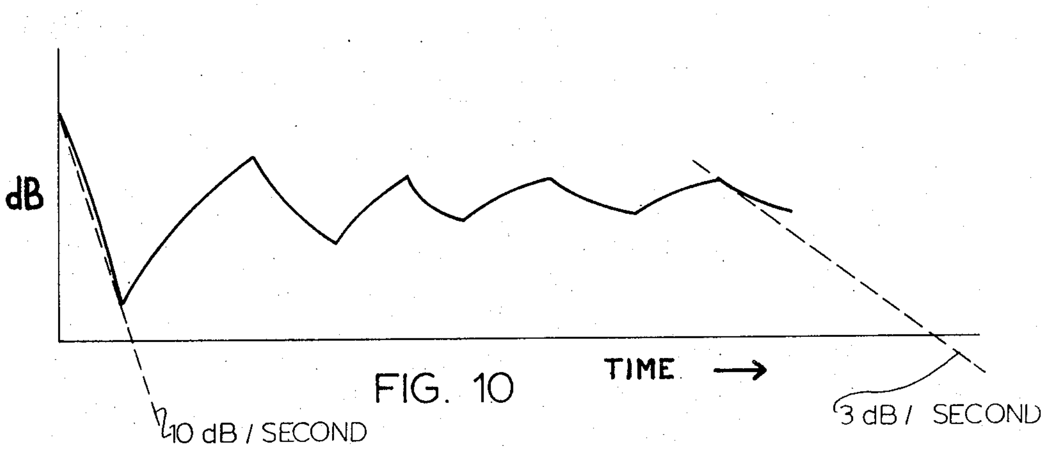
FIG. 10 is a generalized waveform of control voltage obtained during one tone presentation of a typical hearing test utilizing the circuit of FIG. 9 in conjunction with the preferred embodiment attenuator circuit.

In current audiological practice when using automatic audiometers to test the hearing of selected examinees, it is frequently desirable to rhythmically interrupt or pulse a test tone to which an examinee is being exposed. It has been experimentally determined that an interrupted or pulsating tone is more clearly intelligible to an examinee when the tone intensity is very close to his threshold, than would a continuous, uninterrupted tone. Tonal interruptions and pulsations are herein synonymously defined as being a regularly occurring series of events whereby each event causes a given audio signal to be momentarily substantially decreased in amplitude. Referring to FIG. 5, the instant invention circuitry, in both embodiments is readily adapted to accomplish tonal interruptions in a novel manner through the addition of a circuit represented within dashed lines 74, adapted to introduce a modified square wave into the invention circuit, the purpose of which is to cause rapid fluctuations in the control ramp voltage being supplied the invention circuit. The instant invention is thereby adapted to decrease the amplitude of an audio signal by approximately 40 decibels corresponding to each tonal pulse or interruption, e.g. Thus an audio tone whose amplitude is as much as 35 decibels above an examinee's threshold of hearing (a level in excess of those even rarely occurring in a hearing test of the class described) will be sufficiently diminished during each tonal interruption or pulse such that the examinee will no longer perceive the tone.

Tonal interruption is accomplished by passing a square wave represented by FIG. 8-A, having suitable amplitude and a one-half second period, for example, into a square wave conditioning circuit 60 which is adapted to alter the wave shape so as to reduce the rise and fall times and to round the wave corners 112 somewhat as shown in FIG. 8-B. This is accomplished by the combined action of a capacitor 63 and Zener diode 62 in shunt configuration around an operational amplifier 64 adapted by appropriate resistors 65, 66, 67 to pro-

PROGRAMMABLE AUDIO LEVEL CONTROL USEFUL IN AUDIOMETRIC APPARATUS

BACKGROUND OF THE INVENTION

1. Field of the Invention

This invention relates to programmable audio level control devices useful in audiometric apparatus.

2. Description of the Prior Art

In the field of audiology, it has frequently been useful to combine a potentiometer or attenuator with a motorized drive mechanism in an audiometer, so as to programmably vary the amplitude level of a given signal at a given frequency, and in so doing ascertain a given person's hearing threshold. This is especially the case in audiometers and audiological devices which operate in accordance with the teachings of Von Bekesy, since these are adapted to be continuously swept over a wide decibel range, e.g., 0–90 db, in order to accurately determine the degree of hearing loss. In these types of audiometers and audiological apparatus, the programmable audio level control devices employed have largely been directed to electromechanically operated potentiometers wherein a sliding contact moving along a resistive wound element provides the degree of signal attenuation desired.

As an improvement to so-called Bekesy audiometers, the Grason-Stadler Corporation has recently obtained U.S. Pat. No. 3,673,328 for a rate of amplitude change control adapted to vary signal amplitude from a relatively high rate to a relatively low rate as a test sequence progresses. This enables a test subject to rapidly seek his hearing threshold. Such amplitude change control although employing a solid state counting circuit, also uses switches, cam drives, gear means and motorized means all of which are sources of acoustic noise. In principal of operation the amplitude change control in the above cited patent effects rate of amplitude changes in a stepwise fashion based on the number of subject responses. Such stepwise amplitude changes appear to be more confusing to a test subject than does a continuous amplitude change free of acoustic noise as this invention provides.

Other apparatus commonly employed to test hearing have not required that the signal be continuously swept through a given decibel range, but rather have employed stepping switches, relays, and the like, to incrementally vary the sound pressure level an examinee is hearing in a stepwise fashion. This type of sound attenuating device also lends itself to being programmed by appropriate logic means. The Grason-Stadler Corporation, for example, has recently made publicly available a digitally programmable attenuator utilizing a plurality of fixed resistive attenuators switched in a binary sequence. While constituting a major advance in the field of audiological apparatus, this last mentioned and all other known types of attenuators possess certain inherent drawbacks as will now be described.

Since the potentiometric attenuators presently in use are mechanical by nature, they are subject to wear and deterioration. In the case of rotatable wiper arms moving against a resistive coil, dust and worn particles are scraped from the coil after a period of use. Such dust and particles inhibit optimum contact between the wiper arm and the coil resulting in a "noisy" attenuator. This type of "noise" will appear to the test examinee as bothersome scratching and popping, and may adversely affect his ability to correctly respond to the actual test tones presented during a hearing test. Likewise, attenuators operating in a stepwise fashion tend to generate voltage transient noise as contact is made and broken between the various switches. This too will appear as extraneous noise to the test examinee. Due to the presence of excessive switching transients between attenuative steps, a digitally operable attenuating device of the type mentioned is wholly unsuited for the continuous level sweeping operation as required by the Von Bekesy system. In addition, any spurious or system generated noise will distort the input signal frequency causing the test examinee to respond to tones other than the controlled test frequencies, and thus invalidating a hearing test.

The problems of electromechanical attenuators and potentiometers have made it increasingly more desirable to use electronic components which can be electrically programmed and which have no moving component parts to wear. Heretofore, these electronic components have been directed to electrically altering the resistance of a circuit element, and have included such devices as the field effect transistor (F.E.T.), various diodes, transistors in which a bias current is adapted to induce variance in gain qualities, and the photo-resistor in which the amount of light falling upon the component is approximately inversely proportional to the resistance of the component. However, these devices have characteristically introduced electrical nonlinearity and distortion at some degrees of attenuation, functional nonlinearity, wherein the degree of attenuation in decibels is not directly proportional to the varying control voltage over a wide range of attenuation, e.g., 0–90 dB, and where transistors and diodes have been employed, have been characterized by temperature instability over long periods of operating time. It can be seen that while the present invention is basically electronic in nature it eliminates the need to alter a component resistance as in the prior art. Thus, the undesirable characteristics just mentioned are substantially eliminated. In contrast to the prior art, the present invention is based on the discovery that electronic control over the amplitude of a given audio signal can be much improved by the use of functional logging and exponentiating solid state components in conjunction with an additive variable control voltage acting only on the amplitude component of a given input audio signal, so as to precisely maintain the frequency and linearity of the signal, while substantially varying the amplitude component.

SUMMARY OF THE INVENTION

The present invention is directed to a programmable audio level control useful in audiometric apparatus, of the type wherein the sound pressure level a test examinee is hearing is adapted to be continuously increased or decreased. In preferred form, the circuitry comprises a series of operational amplifiers and associated diode elements adapted to electrically compute the logarithm of a selected input signal, add a variable control voltage adapted to proportionally control the output amplitude of the input signal, and finally electrically exponentiate the resultant sum. Means are provided to suitably regulate and program the amount of variable control voltage added, and consequently, the amount of control voltage added may be used as a proprotional measure of the output signal amplitude. The present a. tone generator means operable to supply in a selected sequence each of a plurality of tone signals in the audio frequency range;

b. logarithm circuit means connected to said tone generator means and adapted to receive and produce from each said selected tone signal an output signal representing the logarithm thereof;

c. a continuous control voltage source productive of a ramp voltage wave controllable as to ascending and descending direction and representing a control voltage having a maximum and minimum values when moving in either direction and being se-

5. In an audiometric circuit as claimed in claim 3 wherein said logarithm circuit, first and second circuit means each comprise solid state circuit means.

6. In an audiometric circuit as claimed in claim 3 wherein:

a. said logarithm circuit comprises a diode;

b. said control voltage source comprises a ramp generator;

c. said summing circuit means comprises a solid state computing amplifier;

d. said voltage control comprises manually operated electrical switching means;

above equation reduces to: $I_F \approx I_1 e^{-qV_c/KTR_{34}}$, and the output voltage of amplifier 42 is given by $V_{OUT} = -R_{36} I_F \approx -R_{36}I_1 e^{-qV_c/KTR_{34}}$. Expanding $I_1$ in terms of its definition, $V_{OUT} = -(VkR_{36}R_{32} + R_{36} A \sin wt/R_{31}) e^{-qV_c/KTR_{34}}$. For $V_k$ varying slowly, the first term of the above equation contains only low frequencies which are removed by the action of the capacitor 60 and resistor 37 combination. The resulting net equation is therefore: $V_{OUT} = AR_{36}/R_{31} e^{-qV_c/KTR_{34}}$. Converting this equation to base 10 where $\ln 10 = 2.3$ or $\ln x = 2.3 \log_{10} x$ the resultant equation is: $V_{OUT} = AR_{36}/R_{31} \exp_{10} -qV_c/2.3\ KTR_{34}$. Converting $V_{OUT}$ to decibels with respect to a given constant voltage, $V_{REF}$, the final output level is: $dB = 20 \log_{10} V_{OUT}/V_{REF} = 20 \log_{10} V_{OUT} - 20 \log V_{REF} = (20 \log_{10} AR_{36}/R_{31}) - qV_c/2.3KTR_{34} - 20 \log_{10} V_{REF}$.

The first and third terms of the last expression are constant. At a constant temperature, the second term of the expression is directly proportional to $V_c$. This is expressed concisely by:

$$dB = K_1 + K_2 V_c$$

where $K_1 = 20 \log_{10} AR_{36}/R_{31}V_{REF}$ and $K_2 = -q/2.3\ KTR_{34}$.

From the above equations it is apparent that the functional logging and exponentiating techniques employed by the present invention circuit have the advantage of providing a linearly proportional relationship between the amount of control voltage $V_c$ applied, and the final output level in decibels of a given input signal S.

Referring to FIG. 3, in actual practice a circuit was constructed in accordance with FIG. 1, generally designated 61 and was combined with the following elements: sine wave generator 15, continuous chart recorder 56, earphones 57, and examinee switch 58, representing a possible use of the invention circuitry in a hearing testing apparatus of the type wherein the test examinee controls the sound pressure level of the audio signal presented to him. Under operating conditions over a frequency range of 500–6000 hertz and a sound pressure level range of approximately 0–85 dB, the invention circuitry yielded accurate level control to within 0.14 dB. As in conventional automatic audiometry, operation proceeds as the user listens through the earphones 57 until a signal becomes audible, then he depresses the control switch 58 until the signal becomes inaudible. The process is repeated at various frequencies to establish a hearing range at different frequencies for a selected individual, from which a figure of hearing loss or damage can be calculated. Note that with the invention circuitry this figure of hearing loss may now be obtained from the control voltage $V_c$ which is directly proportional to the output signal in dB. It is contemplated that when the level control of the invention is applied to an audiological use small voltages may be added to or deleted from the control voltage $V_c$ for each frequency being utilized to compensate for earphone deficiencies and the well-known Fletcher-Munson equalization curve at each frequency.

Referring now to FIG. 4, the action by the invention circuitry upon an audio signal source of given amplitude and frequency is graphically shown. A signal source having a sinusoidal waveform with constant frequency and amplitude is represented by FIG. 4-A. This signal may suitably be a "pure tone" audio signal within the normal hearing range and may be generated by a sine generator or other well-known means. FIG. 4-B represents a typical input signal, only converted into logarithmic form. FIG. 4-C represents the continuously varying control voltage source having equivalent rise and fall times, the outer envelope of which is regulated by the operator through previously mentioned control means. FIG. 4-D represents the sum of the logged signal and the varying voltage source. FIG. 4-E represents the final exponentiated output signal having decibel gain qualities inversely and linearly proportional to the rising and falling action of the varying control voltage $V_c$, and having frequency equal to the original signal S. Therefore, as more voltage is applied to the invention circuit, greater positive signal attenuation from a fixed maximum amplitude is realized. This final output signal is shown with low frequency components removed for purposes of illustration, Through the alternate use of non-inverting operational amplifiers the above relationship becomes linearly proportional.

As previously noted, the addition of constant voltage $V_k$ serves to provide the input signal S with a fixed polarity, as well as a voltage quantity greater than zero. If a signal source, having fixed polarity and emitting a signal having voltage greater than zero, is provided by signal generator 15, the addition and final deletion of a voltage constant is not required.

In current audiological practice when using automatic audiometers to test the hearing of selected examinees, it is frequently desirable to rhythmically interrupt or pulse a test tone to which an examinee is being exposed. It has been experimentally determined that an interrupted or pulsating tone is more clearly intelligible to an examinee when the tone intensity is very close to his threshold, than would a continuous, uninterrupted tone. Tonal interruptions and pulsations are herein synonymously defined as being a regularly occurring series of events whereby each event causes a given audio signal to be momentarily substantially decreased in amplitude. Referring to FIG. 5, the instant invention circuitry, in both embodiments is readily adapted to accomplish tonal interruptions in a novel manner through the addition of a circuit represented within dashed lines 74, adapted to introduce a modified square wave into the invention circuit, the purpose of which is to cause rapid fluctuations in the control ramp voltage being supplied the invention circuit. The instant invention is thereby adapted to decrease the amplitude of an audio signal by approximately 40 decibels corresponding to each tonal pulse or interruption, e.g. Thus an audio tone whose amplitude is as much as 35 decibels above an examinee's threshold of hearing (a level in excess of those even rarely occurring in a hearing test of the class described) will be sufficiently diminished during each tonal interruption or pulse such that the examinee will no longer perceive the tone.

Tonal interruption is accomplished by passing a square wave represented by FIG. 8-A, having suitable amplitude and a one-half second period, for example, into a square wave conditioning circuit 60 which is adapted to alter the wave shape so as to reduce the rise and fall times and to round the wave corners 112 somewhat as shown in FIG. 8-B. This is accomplished by the combined action of a capacitor 63 and Zener diode 62 in shunt configuration around an operational amplifier 64 adapted by appropriate resistors 65, 66, 67 to probeing effective at the onset of each said tone to cause the amplitude rate of change of said respective tone signal to gradually and smoothly decrease according to a programmed sequence.

30. In an audiometric circuit as claimed in claim 29 wherein said amplitude control means comprises a decaying voltage source means.

* * * * *